United States Patent [19]

Perazzolo et al.

[11] Patent Number: 4,538,493
[45] Date of Patent: Sep. 3, 1985

[54] MACHINE TOOL FOR WORKING SHEET METAL

[75] Inventors: Eugenio Perazzolo, Rovigo; Mauro Tomasi, Bologna, both of Italy

[73] Assignee: Rainer S.r.l., Bologna, Italy

[21] Appl. No.: 532,531

[22] Filed: Sep. 15, 1983

[30] Foreign Application Priority Data

Sep. 27, 1982 [IT] Italy ............................... 3545 A/82

[51] Int. Cl.³ .......................... B26D 5/08; B26F 1/14
[52] U.S. Cl. ..................................... 83/530; 83/552;
83/685; 318/467; 318/620
[58] Field of Search ................ 83/552, 641, 530, 548,
83/549, 550, 551, 534, 539, 684, 685, 527;
318/663, 467, 626, 620

[56] References Cited

U.S. PATENT DOCUMENTS

| 3,139,779 | 7/1964 | Bredow | 83/552 |
| 3,662,640 | 5/1972 | Wrona | 83/530 |
| 3,853,029 | 12/1974 | Todd | 83/552 |
| 4,250,441 | 2/1981 | Chapman et al. | 318/626 |
| 4,256,999 | 3/1981 | Richter et al. | 318/626 |
| 4,265,156 | 5/1981 | Stubbings | 83/552 |

Primary Examiner—E. R. Kazenske
Assistant Examiner—Hien H. Phan
Attorney, Agent, or Firm—Morgan, Finnegan, Pine, Foley & Lee

[57] ABSTRACT

A machine tool for working sheet metal is described. The principal characteristic of the present invention lies in the fact that it comprises electronic apparatus operable to control the adjustment of the stroke of a striker which can strike a pin supporting a tool for punching or nibbling a metal sheet.

12 Claims, 3 Drawing Figures

MACHINE TOOL FOR WORKING SHEET METAL

BACKGROUND OF THE INVENTION

The present invention relates to a machine tool for working sheet metal.

As is known, machine tools currently commercially available comprise a rotatable turret supporting a plurality of pins in a peripheral ring, which pins can slide axially under the action of a striker positioned above the turret and controlled mechanically or by means of a hydrodynamic system. By striking on the head of the pin the striker causes a tool supported by this latter and shaped for example as a punch or as a nibbler, to perform a punching or nibbling operation on a portion of sheet metal positioned beneath the turret. Tools utilised in such machines can be of various types. A first type of punch, for example, comprises a central cylindrical portion, an upper cylindrical portion which in use is fixed to the lower end of the tool-carrier pin, and a lower portion the end of which can cut a portion of sheet metal. This lower portion is lodged in a plastics material sleeve the longitudinal dimensions of which are greater than that of the lower portion itself. Beneath the turret the sheet metal rests on a second rotatable turret positioned in a cavity formed in the worktable of the machine. This second turret supports, in a ring around its own periphery, a plurality of dies equal in number to the punches. Such dies are the elements in which are formed respective holes the outline of which is similar to the outline of the lower portion of the punch in such a way that when this latter acts on the sheet metal the portion cut from this latter is carried into the interior of the hole of the die and from which it is then expelled. During punching the plastics sleeve striking the body part of the die is restrained thereby allowing the lower part of the punch to extend out from its longitudinal hole, which punch first cuts the sheet metal and then pushes the cut portion into the cavity in the associated die. A second type of punch tool differs from that just described by the fact that it includes a spring member in place of the plastics sleeve. This latter includes a first fixed plate having a central hole engaged by the central portion of the punch, a second, movable, plate parallel to the first plate and having a central hole housing the lower portion of the punch, and a plurality of springs positioned between the two plates. In the rest position the end of the lower portion of the punch remains within the hole in the movable plate. During operation of the machine the spring member behaves as the plastics spring just described. The nibbling tools operate in the same way as described for punches but perform exclusively the nibbling operation.

Machine tools described above have various disadvantages.

In particular, in such machines the adjustment of the stroke of the tool carrier pin is complex to achieve and at times insufficiently precise. The stroke of the tool carrier pin is a function of the thickness of the sheet metal to be cut or nibbled and the distance, when punches are being used, between the cutting point of the lower portion of the punch and the lower end of the longitudinal hole (housing such lower portion) of the plastics sleeve or of the movable plate, in dependence on the type of punch used. Obviously, adjustment of the stroke of the tool carrier pin is required whenever the thickness of the sheet metal to be cut or nibbled is varied, or when the distance between the cutting point of the punch and the lower end of the plastics sleeve varies. This distance varies when material is removed from the said tip by sharpening it after wear. Naturally the same considerations apply when nibbling tools are to be sharpened. Currently the adjustment of the starting point of the stroke of the pin is effected by inserting a plate of predetermined thickness over the head of the pin. The thickness of such plate is sometimes not determinable a priori and therefore the required correct adjustment is obtained by trial and error, that is to say by trying plates of different thickness and subsequently testing the operation of the tool on the sheet metal. It is apparent that such adjustment requires a long time, which is reflected in production costs.

SUMMARY OF THE INVENTION

The object of the present invention is to provide a machine tool for working sheet metal which will be free from the above mentioned disadvantages, that is to say it will allow easy and precise adjustment of the stroke of the tool-carrier pin at the same time achieving reduced production costs.

Further objects and advantages achieved by the present invention will become apparent in the following descriptions.

According to the present invention there is provided a machine tool for working sheet metal, of the type comprising:

An upper turret rotatably supporting, in a ring, a plurality of displaceable pins each of which supports a tool of the punch or nibbler type; a lower turret rotatable parallel to and connected with the said upper turret and supporting a plurality of holders in a ring, the number of holders being equal to that of the said pins and each of which holders carries a die in such a way that one of the said dies is associated with each of the said tools; and a striker displaceable between an upper dead point and a lower dead point under the action of an hydrodynamic system or a mechanical transmission which, in use, controls the pressure of the saidstriker on a head of one of the said pins in such a way that these translate downwardly and the associated said tool, by entering within a hole of the said die, performs a cutting or nibbling of a portion of the sheet metal located beneath the said die;

characterised by the fact that it includes electronic means by which the operator can, in use, adjust the stroke of the said striker, that is to say the lower dead point and the upper dead point for each of the said tools, the said means including identification members for identifying the said tool involved in the adjustment, a first member for adjusting the upper dead point of the said striker for each of the said tools, a second member for adjusting the lower dead point of the said striker for each of the said tools, and a comparison member for comparing between a stroke determined, by means of the said first and second adjustment members, and a stroke which the said striker progressively performs, in such a way as to be able to control the stopping of the translation of the said striker by means of a first and a second abutment member.

BRIEF DESCRIPTION OF THE DRAWINGS

For a better understanding of the present invention a preferred embodiment will now be described purely by way of non-limitative example, with reference to the attached drawings, in which.

DETAILED DESCRIPTION OF THE INVENTION

Figure 1:
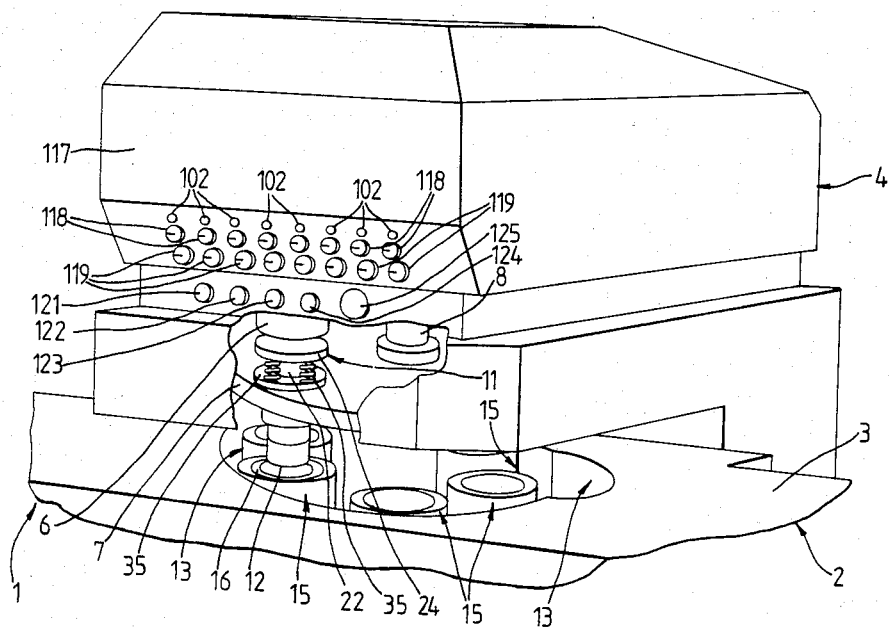
FIG. 1 is a partial perspective view of a machine tool for working sheet metal.

As illustrated in FIG. 1, a machine tool for working sheet metal and formed according to the principles of the present invention is generally indicated with the reference numeral 1. The machine 1 includes a work table 2 on an upper wall 3 of which a metal sheet rests in use, and a structure 4 positioned over the table 2 and housing an electronic system 5 for the control of the stroke of a striker 6 which is supported within the structure 4. The machine 1 further includes a cylindrical turret 7 keyed into a rotatable shaft 8 and supporting a peripheral ring of pins 11 translatable along their longitudinal axes and each of which carries a tool which in the drawing is represented as a punch 12, but which could for example be also represented by a nibbling tool.

In detail, the striker 6 has an axis coaxial with the axis of the pin 11 positioned under it. On the work table 2, in correspondence with the turret 7 there is formed a cylindrical cavity 13 housing a second turret 14 (FIG. 2) keyed onto a shaft connected by gearing to the shaft 8 and supporting, around a peripheral ring, a plurality of holders 15 each of which houses a die 16. In particular there are a number of holders 15 equal to the number of pins 11. It is evident that, since each punch 12 has an associated die 16, if each punch 12 has a predetermined shape the associated die 16 will also have a corresponding shape adapted to its punch 12.

Figure 2:
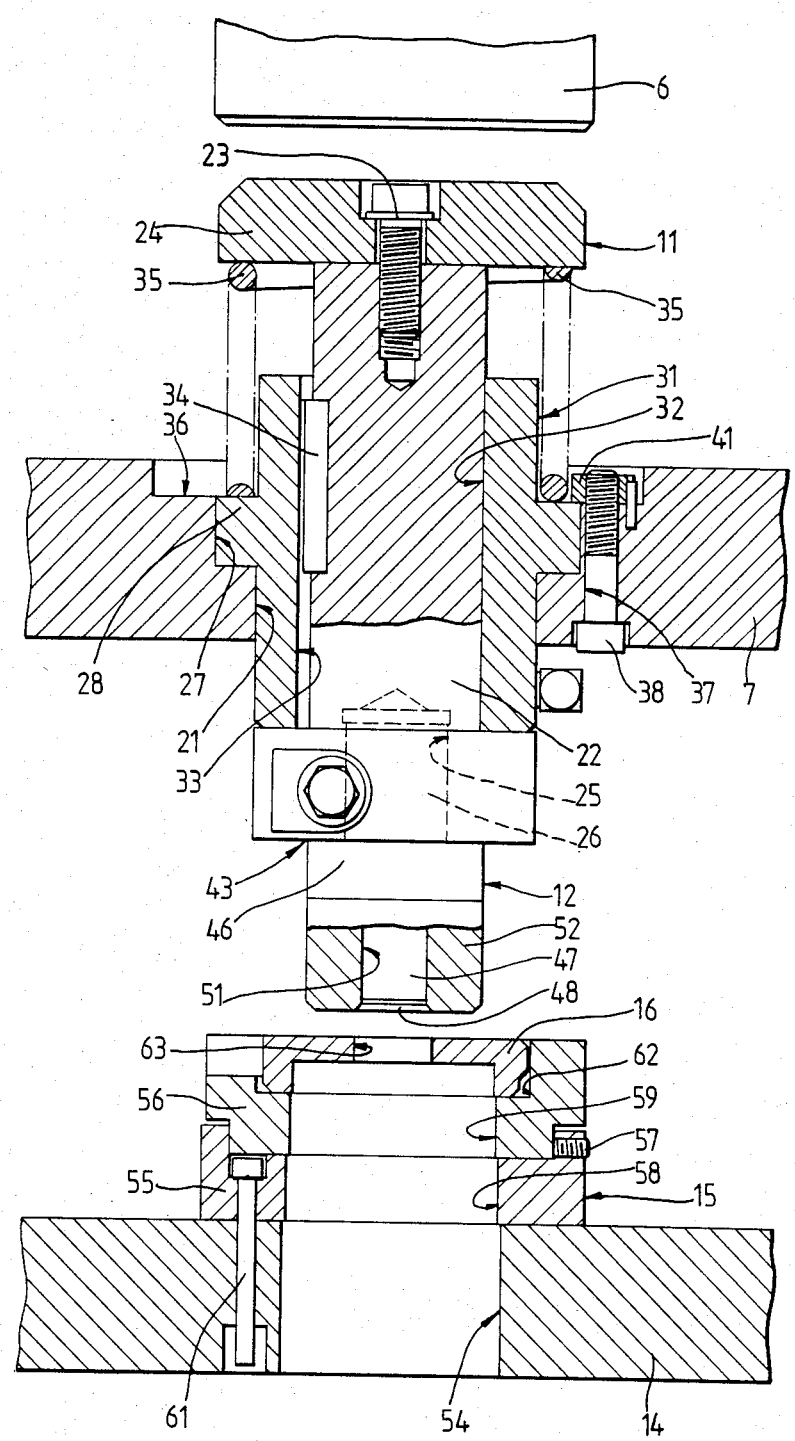
FIG. 2 is a section of a detail of the machine of FIG. 1.

With reference to FIG. 2, the turret 7 has a plurality of through holes 21 housing the pins 11 which have a cylindrical element 22 to the upper end of which there is fixed, by means of a screw 23, a head 24 of enlarged diameter and in the lower end of which there is formed a blind hole 25 housing an upper portion 26 of the punch 12. Along the hole 21, going from the bottom upwards, there is formed an annular rebate 27 engaged by an annular projection 28 of a guide 31 lodged in the hole 21 and having within its longitudinal bore 32 the cylindrical element 22 of the pin 11. In particular, along this bore 32 for the while of its longitudinal extent, there is formed a groove 33 engaged by a key 34 supported by the cylindrical element 22 of the pin 11 in such a way that in use this latter has only the possibility of translating along its longitudinal axis. Between the head 24 of the pin 11 and the annular projection 28 of the guide 31 there is inserted a plurality of helical springs 35 operable to resist the downward translation of the pin 11. Along the hole 21, beyond the cavity 27, there is formed a second annular rebate 36. Alongside the hole 21 on the turret 7 there is formed at least one hole 37 the axis of which is parallel to the axis of the hole 21 and opening into the rebate 36. The hole 37 is engaged by a screw 38 the threaded part of which projects from the hole 37 into the cavity 36. On this threaded part there is screwed a nut 41 a part of which presses the annular projection 28 of the guide 31 downwards to lock this within the hole 21. At its lower end the pin 11 has a fixing member 43 of eccentric type operable to lock the upper portion 26 of the punch 12 within the blind hole 25.

As illustrated in FIG. 2, the punch 12 has an upper portion 26, a central portion 46, and a lower portion 47 of diameter less than that of the central portion 46. The lower portion 46 has a tip 48 which can cut a metal sheet in an outline defined by its own shape. The lower portion 47 is lodged in a hole 51 longitudinally formed in a cylindrical element 52 of plastics material. In particular, the tip 48 lies within the hole 51 and the element 52 has a diameter substantially equal to the diameter of the central portion 46. The turret 14 has a plurality of through holes 54 the number of which is equal to the number of holes 21 with which they are coaxial. In correspondence with each hole 54 the turret 14 supports a holder 15 comprising two plates 55 and 56 rigidly connected together by means of a screw 57 and having a respective central through hole 58 and 59. In particular, the holes 58 and 59 are coaxial to one another and to the hole 54. The plate 55 is the lower plate and is fixed to the turret 14 by means of at least one screw 61 and the plate 56 is the upper plate and at the other end of its hole 59 has an annular cavity 62 housing a die 16. This latter is substantially shaped as an inverted cup and has a central through hole 63 coaxial with the axis of the punch 12. In particular the diameter of the hole 63 is substantially equal to the diameter of the lower portion 47 of the punch 12 in that, in use, it is intended for this portion 47 to enter within the hole 63.

Figure 3:
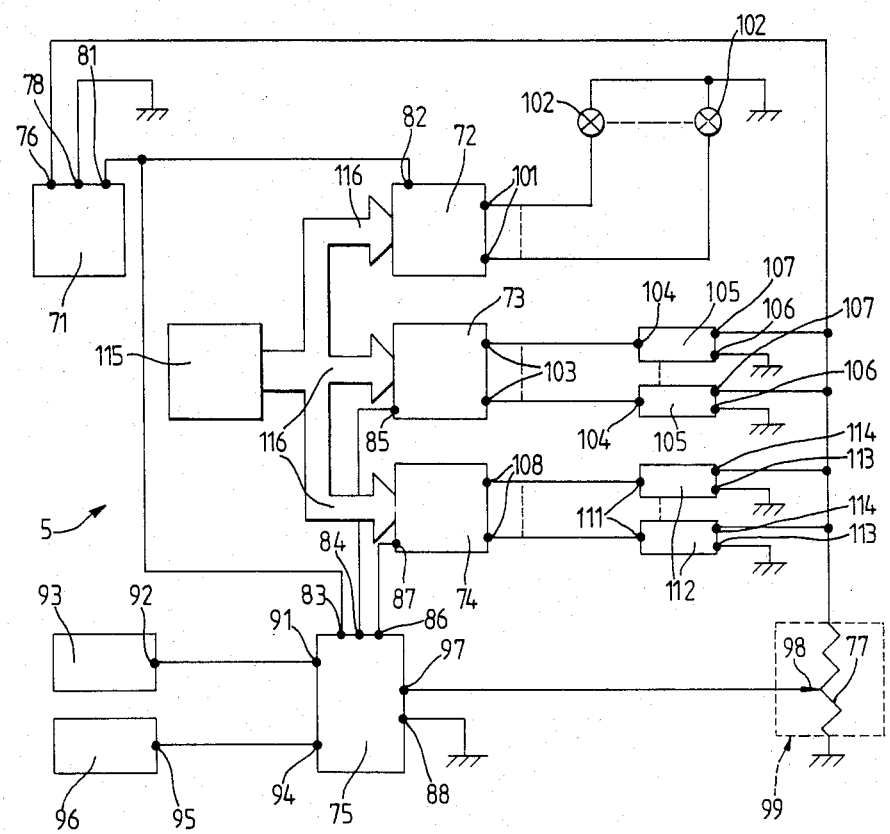
FIG. 3 is a block schematic diagram of an electronic control system for the machine of FIG. 1.

As illustrated in FIG. 3, the electronic system 5 is represented by a block schematic diagram each block of which in turn represents an electronic circuit operable to perform a given function. The system 5 includes a block 71 operable to supply all the other blocks and to generate a fixed reference voltage, three blocks respectively indicated 72, 73 and 74 and operable to perform the function of electronic switches, and a block 75 operable to function as a comparator. The block 71 has a first output 76 representing a fixed reference voltage. To this output 76 there is connected a first terminal of an electrical resistance 77 the other terminal of which is connected to a member at zero potential. A second output 78 of the block 71 is connected directly to the member at zero potential and therefore represents the zero voltage, whilst a third output 81 which represents the supply voltage is connected both to an input 82 of the block 72 and to an input 83 of the block 75. This latter has further an input 84 connected to an output 85 of the block 73, an input 86 connected to an output 87 of the block 74, an output 88 connected directly to the zero potential member, an output 91 connected to an input 92 of a block 93 operable to stop the upward movement of the striker 6, an output 94 connected to an input 95 of a block 96 operable to stop the downward movement of the striker 6, and finally an input 97 connected to a cursor 98 (in the drawings represented by an arrow) operable to slide on the resistance 77. The blocks 93 and 96 are operable to stop the translation of the striker 6 by acting on the hydrodynamic control system of the striker 6. The cursor 98 and the resistor 77 represent a potentiometer which from hereon will be indicated 99 and which in FIG. 3 is identified by a broken outline box. In particular the cursor 98 is rigidly connected to the striker 6 so that it follows the stroke of this latter.

The block 72 has a plurality of outputs 101 connected to first terminals of respective indicator lights 102 second terminals of which are connected to the zero potential member. The block 73 has a plurality of inputs 103 connected to respective outputs 104 of corresponding blocks 105 representing variable reference generators, for example potentiometers. Each block 105 has an output 106 connected directly to the zero potential member and an input 107 connected to the output 76 of the block 71. The block 74 has a plurality of inputs 108 connected to respective outputs 111 of coresponding blocks 112 with the same function as the blocks 105. Each block 112 has an output 113 connected directly to the zero potential member and an input 114 connected to the output 76 of the block 71. The system 5 finally includes a selection block 115 operable to send, simultaneously, a respective electrical signal 116 to the blocks 72, 73 and 74 for selecting which of the indicators 102 and the blocks 105 and 112 are to be fed. This block 115 identifies the punch 12 positioned under the striker 6 and controls the supply of the blocks 105 and 112 and the indicator 102 relating to that punch 12.

With reference to FIG. 1, on a front wall 117 of the structure 4 there is located an upper row of indicator lights 102, a central row of knobs 118 representing the blocks 105, and a lower row of knobs 119 representing the blocks 112. The indicators 102 and the blocks 105 and 112 are equal in number to one another and equal in number to the punches 12 supported by the turret 7. In particular, as already described, to each punch 12 there is associated one of the knobs 118 (block 105) a knob 119 (block 112) beneath it and an indicator 102 above it. On the wall 117 of the structure 4 there are further mounted a start push button 121 by means of which the operation of the machine 1 is enabled, a stop push button 122 by means of which the operation of the machine 1 is stopped, a push button 123 by which an electric motor is controlled for the rotation of the turrets 7 and 14, a push button 124 by means of which the descent of the striker 6 is controlled, and a push button 125 by which the rise of the striker 6 is controlled. In particular the push buttons 124 and 125 act on the hydrodynamic system which causes the descent and rise of the striker 6.

As already described, the machine 1 includes a hydrodynamic system for controlling the stroke of the striker 6. This system has electrically operated valves operable from the outside of the machine 1 by control members for example of the foot pedal type. The punching operation on the sheet metal takes place by first of all resting the sheet metal on the upper wall 3 of the work table 2 and therefore on the guide 16 supported by the turret 14, and subsequently by the push button 123 turning the turrets 7 and 14 in such a way as to carry the punch 12 selected for the punching operation under the striker 6. By controlling the electrically operated valves of the hydrodynamic system the translation of the striker 6 which strikes on the head 24 of the pin 11 which translates downwardly against the action of ths springs 35 is controlled. The action of the striker 6 is such that when the plastics element 52 strikes against the solid part of the die 16 it reduces its longitudinal extent, following this contraction the tip 48 of the lower portion 47 of the punch projects from the hole 51 and enters into the hole 63 of the die 16 thereby cutting a portion of the sheet metal. This cut portion then falls into the hole 54 from where it falls into a suitable container. The plastics element 52 also serves to lock the sheet metal in place during the punching operations. The adjustment of the stroke of the striker and therefore the stroke of the punch carrier pin 11 is effected by the electronic system 5. It is evident that depending on the thickness of the sheet metal to be punched the stroke of the striker 6 must be varied as it is evident that following wear of the tip 48 and therefore after a sharpening operation varying the distance between the tip 48 and the lower end of the plastics element 52, the stroke of the striker 6 will have to be different from what it was previously.

The adjustment of the stroke of the striker 6 takes place in the following way.

It is suitable first of all to say that each punch 12 has an associated block 105 with a knob 118 which determines the upper dead point of the stroke of the striker 6, a block 112 with a knob 119 which determines the lower dead point, and an indicator light 102 which identifies the punch 12 and the knobs 118 and 119 involved in the adjustment. The block 115 has therefore the function of "identifying" the punch 12 positioned under the striker 6 and of "indicating" by means of the electrical signal 116, this to the blocks 72, 73 and 74. The block 72 permits the relevant indicator 102 to be illuminated and the blocks 73 and 74 open the inputs 103 and 108 to the associated blocks 105 and 112. Pressing the push button 124 controls the descent of the striker 6 until it reaches the sheet metal cutting position, that is to say the lower dead point. If, when this position is reached, and upon pressing again the push button 124 the punch descends again, then it is necessary to turn the knob 119, corresponding to the punch 12 which is being adjusted, counterclockwise in such a way that the punch 12 does not descend beyond the cutting position. From what has been said it is apparent that the stroke of the striker is identified by the position of the knobs 118 and 119, that is to say by the electrical voltages at the outputs from the respective blocks 105 and 112 which traverse the respective blocks 73 and 74 to reach the block 75 which compares such voltages with the voltages coming from the potentiometer 99. In other words the inputs 84 and 86 of the block 75, that is the positions of the associated knobs 118 and 119 represent upper and lower threshold voltages respectively.

When the striker 6 is translating upwards and the output voltage from the potentiometer 99 reaches the value of the upper threshold voltage, the block 75 enables the block 96 to stop the upward translation of the striker 6. When the striker 6 is translating downwards and the output voltage from the potentiometer 99 reaches the value of the lower threshold voltage the block 75 enables the block 93 to stop the downward translation of the striker 6. In the case where upon pressing the push button 124 the punch 12 has not reached the cutting position, that is to say if the lower threshold voltage is greater than that necessary for cutting, the knob 119 must be turned in a clockwise sense until, upon pressing the push button 124, this cutting position has been achieved. The lower dead point is therefore the position of the striker 6 in which the punch is in the cutting position and in which upon pressing again the descent push button 124 the punch 12 remains in its cutting position since the striker 6 remains locked against downward translation. The adjustment of the lower dead point can be repeated for all the other punches 12.

For adjustment of the upper dead point one starts from the cutting position, that is from the lower dead point. By pressing the push button 125 the upward translation of the striker 6 is controlled until there is enough space between the punch 12 and the die 16 to be able to move the sheet metal. Therefore the position of the striker 6 which permits sufficient movement of the sheet metal over the work table 2 is that called the upper dead point. It is evident that the correction of this position, as in the case of the lower dead point, can be obtained by turning the knob 118 in counterclockwise sense to translate the punch 12 upwardly and in a clockwise sense to translate the punch 12 downwardly.

It is apparent that the adjustment of the stroke of the striker 6 needs to be effected whenever the thickness of the sheet metal varies, or else whenever the distance between the tip 48 of the punch 12 and the lower end of the sleeve 52 varies. Once the strokes of the various punches 12 have been adjusted, which can be different from one another, the knobs 118 and 119 are locked in their adjusted positions. In use, by controlling the action of the striker 6, this translates between the lower dead point and the upper dead point relating to the associated punch 12, that is the block 75 identifies the threshold voltages which must not be exceeded and enables the blocks 93 and 96 to stop the stroke of the striker 6 when the potentiometer 99 reaches voltages with values equal to those of the threshold voltages.

The operation of the machine 1 can be of the "manual" or of the "automatic" type. The operation of manual type consists in controlling a stroke of the striker 6 by means of a suitable member. Automatic operation consists in controlling the frequency per minute that the striker 6 is made to perform by means of a suitable member. The machine 1 can be provided with an electronic calculator by means of which the desired sequence of punches 12 to be actuated and the position of the sheet metal in dependence on the selected punch 12 can be programmed. The electronic calculator can therefore be operable to select the punches 12 to be actuated and therefore, by means of the block 115 to send the electric signal 116 corresponding to the block 72, 73 and 74. The same considerations apply if a nibbling tool is utilised in place of the punch 12.

The advantages achieved by the present invention are evident. In particular, the machine 1 is provided with a system for adjustment of the stroke of the striker 6 which requires less time to perform by the operator. Moreover, the adjustment effected with such a system, as well as being simplifed, is precise and does not require continuous verification.

Finally, it is clear that the machine 1 described and illustrated hereinabove can be modified and varied without thus departing from the scope of the invention. In particular, the punches 12 and the dies 16 can be of different types and of different shapes. Tools of the nibbler type can be mounted in place of the punch 12. In place of the hydrodynamic system the translation of the striker 6 can be actuated by a cam member.

Further, the electronic circuits operable to control the operation of the machine 1 and to allow the adjustment of the stroke of the striker 6 can be different. For example, the blocks 115 and 112 can be absorbed into a calculator and this latter can be programmed to memorize the threshold voltages and therefore the dead points of each punch 12 and to check these by means of the potentiometer 99.

We claim:

1. A machine tool for working sheet metal comprising:
   an upper rotatable turret (7) supporting, in a ring, a plurality of translatable pins (11) each of which carries a tool (12) of the punching or nibbling type;
   a lower rotatable turret (14) parallel to and connected with the upper turret (7) and supporting, in a ring, a plurality of holders (15), the number of which is equal to the number of pins (11) and each of which supports a die (16) in such a way that each tool (12) has one die (16) associated therewith,
   a striker (6) operable to translate between an upper dead point and a lower dead point under the action of a transmission system which, in use, controls the pressure of said striker (6) on a head (24) of one of said pins (11) in such a way that the pin translates downwardly and the tool (12) associated therewith causes a cutting or nibbling of a portion of a metal sheet positioned over the die (16) associated therewith by entering into a hole (63) in said die (16), and electronic means (5) by which an operator can, in use, adjust the stroke of the said striker (6) and thereby a lower dead point and an upper dead point for each tool (12), said electronic means (15) including members (115) for identifying which tool (12) is involved in the adjustment, a first member (105) for adjusting the upper dead point of said striker (6) for each tool (12), a second member (112) for adjusting the lower dead point of said striker (6) for each tool (12) and a comparison member (75) for comparing the stroke as adjusted by means of the first (105) and second (112) adjustment members and the stroke which said striker (6) then performs on each tool (12) in such a way as to be able to control, by means of a first blocking member and a second blocking member (96) the stopping of the translation of the said striker (6).

2. A machine according to claim 1 wherein the electronic means (5) includes a potentiometer (99) supplied from a source of electrical energy (71) and a cursor (98) rigidly connected with the movement of the striker (6).

3. A machine according to claim 1 wherein each of the first adjustment members (105) includes a first knob (118) by means of which the upper dead point of the stroke of the striker (6) is varied.

4. A machine according to claim 3 wherein the first (105) and second (112) adjustment members are variable reference generators of the potentiometer type supplied by the source of electrical energy (71).

5. A machine according to claim 4 wherein the first (105) and second (112) adjustment members, in use, produce as output upper and lower electrical threshold voltages which are a function of the position of the respective first (118) and second (119) knobs, said upper and lower electrical threshold voltages respectively being compared by the comparison member (75) with voltages arriving at said comparison member (75) from the potentiometer (99) as a function of the stroke of the striker (6) in such a way that during the downward translation when said potentiometer (99) achieves a voltage with a value similar to the value of the lower threshold voltage value arriving from the said second adjustment member (112) said comparison member (75) enables the second blocking member (96) to control the stopping of further translation of said striker (6) and during the upward translation when said potentiometer (99) reaches a voltage value similar to the value of the upper threshold voltage arriving from said first adjustment member (105) said comparison member (75) enables the first blocking member (3) to control the stopping of further translation of said striker (6).

6. A machine according to claim 1 wherein each of the second adjustment members (112) includes a knob (119) by which the lower dead point of the stroke of the striker (6) is varied.

7. A machine according to claim 1 wherein the electronic means (5) includes a first switching member (73) operable to receive an electrical signal (116) from an identification member (115) and to put the first adjustment member (105) relating to the identified tool (12) in communication with the comparison member (75), and a second switching member (74) operable also to receive said electrical signal (116) and to put the second adjustment member (112) relating to the identified tool (12) into communication with said comparison member (75).

8. A machine according to claim 7 wherein the electronic means (5) includes a third switching member (72) operable also to receive the electrical signal (116) and operable to actuate an indicator light (102) relating to the identified tool (12).

9. A machine according to claim 8 including a structure (4) in which electronic means (5) is housed and which has a front wall (117) in which are mounted in three rows, respectively, the first (118) and second (119) knobs and the indicator lamps (102), in such a way that each tool (12) is associated with one of said indicator lights (102) and which, when in use, the associated tool (12) is in correspondence with the striker (6) and illuminates to indicate which of the first (118) and second (119) knobs relate to that particular said tool (12).

10. A machine according to claim 1 wherein the wall (117) of the structure (4) has mounted therein a push-buttom keyboard having a first push-buttom (121) by which the operation of the machine is actuated, a second push-buttom (122) by which said operation is stopped, a third push-button (123) by which, by means of an electric motor, rotation of the upper turret (7) and lower turret (14) is controlled, a further push-button (124) and a first (125) push-button by which, respectively, the descent and rise of the striker (6) is controlled by acting on the transmission system to actuate the stroke of the striker (6).

11. A machine according to claim 1 wherein the transmission system is a hydrodynamic system.

12. A machine according to claim 1 wherein the transmission system is a mechanical system.

* * * * *